(12) United States Patent
He et al.

(10) Patent No.: US 10,489,925 B2
(45) Date of Patent: Nov. 26, 2019

(54) 3D SENSING TECHNOLOGY BASED ON MULTIPLE STRUCTURED ILLUMINATION

(71) Applicant: Shenzhen Goodix Technology Co., Ltd., Shenzhen (CN)

(72) Inventors: Yi He, Shenzhen (CN); Bo Pi, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 171 days.

(21) Appl. No.: 15/675,779

(22) Filed: Aug. 13, 2017

(65) Prior Publication Data

US 2019/0051004 A1  Feb. 14, 2019

(51) Int. Cl.
| | |
|---|---|
| *G06T 7/521* | (2017.01) |
| *G06T 7/194* | (2017.01) |
| *G06T 7/586* | (2017.01) |
| *G01C 3/08* | (2006.01) |
| *G01B 11/22* | (2006.01) |

(Continued)

(52) U.S. Cl.
CPC ............ *G06T 7/521* (2017.01); *G01B 11/026* (2013.01); *G01B 11/22* (2013.01); *G01B 11/25* (2013.01); *G01C 3/08* (2013.01); *G01S 7/4815* (2013.01); *G01S 7/493* (2013.01); *G01S 17/46* (2013.01); *G01S 17/89* (2013.01); *G06T 7/194* (2017.01); *G06T 7/586* (2017.01); *G06T 2207/10004* (2013.01); *G06T 2207/10024* (2013.01); *G06T 2207/10028* (2013.01); *G06T 2207/20224* (2013.01)

(58) Field of Classification Search
CPC ................................ G06T 7/586; G01B 11/25
See application file for complete search history.

(56) References Cited

U.S. PATENT DOCUMENTS

| | | | | |
|---|---|---|---|---|
| 4,843,565 A | * | 6/1989 | Rose ...................... | G01S 11/12 250/559.38 |
| 2004/0213463 A1 | * | 10/2004 | Morrison ............... | G01B 11/25 382/210 |

(Continued)

FOREIGN PATENT DOCUMENTS

WO  2008087652 A2  7/2003

OTHER PUBLICATIONS

European Search Report dated Feb. 19, 2019 in the corresponding EP application (application No. 18761995.2).

*Primary Examiner* — Nay A Maung
*Assistant Examiner* — Jose Torres
(74) *Attorney, Agent, or Firm* — Kilpatrick Townsend & Stockton LLP (57) ABSTRACT

Various embodiments can measure a distance of an object. For achieving this, a first light source and a second light source can be configured to emit first light and a second light toward the object to illuminate the object. The emission of the first light and second light can be configured such that the two lights converge at a first point and diverge at a second point. An optical sensor can be used to capture a first image of the object illuminated by the first light, and capture a second image of the object illuminated by the second light. An image difference between the first image and the second image of the object can be determined. The distance of the object with respect to the first point can then be determined based on the image difference and a distance difference between the first point and the second point.

16 Claims, 10 Drawing Sheets

(51) Int. Cl.
*G01S 17/46* (2006.01)
*G01S 17/89* (2006.01)
*G01S 7/481* (2006.01)
*G01S 7/493* (2006.01)
*G01B 11/02* (2006.01)
*G01B 11/25* (2006.01)

(56) References Cited

U.S. PATENT DOCUMENTS

| | | |
|---|---|---|
| 2008/0024754 A1 | 1/2008 | Mack |
| 2008/0186475 A1* | 8/2008 | Kawata ................ G01B 11/026 356/73 |
| 2008/0231835 A1* | 9/2008 | Iizuka .................... G01S 17/08 356/72 |
| 2013/0321791 A1* | 12/2013 | Feldkhun ........... G01B 11/2518 356/4.01 |
| 2015/0222798 A1 | 8/2015 | Fuchikami |
| 2015/0226553 A1* | 8/2015 | Fuchikami ............. G06T 7/586 348/135 |
| 2018/0232899 A1* | 8/2018 | Lansel ................... G06T 7/586 |

\* cited by examiner

3D SENSING TECHNOLOGY BASED ON MULTIPLE STRUCTURED ILLUMINATION

TECHNICAL FIELD

The embodiments herein generally relate to depth measuring method for determining a distance of an object.

BACKGROUND

In 3D computer graphics, a depth map is an image or image channel that contains information relating to the distance of the surfaces of scene objects from a viewpoint. Various methods are generally known for determining a depth map. For example, Time of fly (TOF) is known in the art for measuring a distance of an object with respect to a reference point by emitting light beams towards an object. Typically, under TOF, a light may be emitted towards the object at $t_1$ and the returned light (due reflection off the object) can be captured at time $t_2$. The time difference between $t_1$ and $t_2$ can be calculated. Because the speed of light is known, the distance of the object with respect to the reference point can be known based on time difference. However, a drawback associated with TOF for determining an object distance is that a single light can be used to measure the distance of only one point (or only one area) of the object. In order for determining the depth map, lights typically need to be "shot" towards different points on the object (for example in a scanline fashion) to determining distances of those points on the object. This can be inefficient and time consuming. In some other approaches that use TOF detector array to achieve 3D image, the performance is affected by the background light strength and the target surface reflection.

Another known method for distance measuring is triangulation method that projects a narrow band of structured light onto a three-dimensionally shaped surface. The light projection can produce lines of illumination that appears distorted from other perspectives than point of the projection, and can be used for an exact geometric reconstruction of the surface shape (light section). Under this method, light patterns can be generated by passing light through a digital spatial light modulator, and depth cues can be obtained from the observed stripe patterns. The displacement of any single stripe can directly be converted into 3D coordinates. For this purpose, the individual stripe has to be identified and analyzed. However, analyzing the stripes strongly relies on the relative positions of the camera. This limitation is not acceptable in some situations that need very tiny package (hardware) for measuring a distance of an object, such as fingerprint detection in a smartphone.

Therefore, there is a need for an improved measuring method for determining a distance of an object that is efficient and easy to implement.

SUMMARY

Various embodiments can measure a distance of an object. For achieving this, a first light source and a second light source can be configured to emit first light and a second light toward the object to illuminate the object. The emission of the first light and second light can be configured such that the two lights converge at a first point and diverge at a second point. An optical sensor can be used to capture a first image of the object illuminated by the first light, and capture a second image of the object illuminated by the second light. An image difference between the first image and the second image of the object can be determined. The distance of the object with respect to the first point can then be determined based on the image difference and a distance difference between the first point and the second point.

In various implementations, one or more of the following features may be included. In some implementations, a collimator can be configured to cause the first light and the second light completely overlap the first point. The determined image difference can indicate a level of overlap between the first light and the second light at a given point between the first and second points. In some implementations, a light beam structure mask can be used to structure the first light and the structure the second light such that they comprise a set of sub-light-spots. In those implementations, each sub-light spot in the structured first light corresponds to a sub-light spot in the structured second light.

In some implementations, determining the image difference between the first image and the second image of the object can includes: comparing a position of a sub-light-spot in the structured first light and a position of a corresponding sub-light-spot in the structured second light. In some implementations, based on the image difference, an overlap level between the first light and the second light at the given point can be determined. In some implementations, the optical sensor can be configured to capture a color image, and the first and second light sources can be configured such that the first light and the second light have different colors. In those implementations, a single color image can be captured for determining the overlap level of the two lights at a given point, since the color image can have different color information corresponding to the first light and the second light. In some implementations, background light can be removed in the first and second images before determining the image difference.

Implementations of the described techniques may include hardware, a method or process, or computer software on a computer-accessible medium.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Various embodiments can facilitate measuring a distance of an object of interest. The distance of the object can be determined by comparing two images of the object. Traditional triangulation method typically requires stripes or light patterns on the object to be observed at different positions when comparing images of the objects. Unlike the traditional triangulation method, embodiments in accordance with the disclosure can obtain the distance information by simply casting a few lights toward the object. In these embodiments, unlike the traditional triangulation method where cameras need be placed at particular positions for observing the stripe patterns on the object, a simple optical sensor can be placed at any position for capturing images of the object illuminated by the lights. Configurations of the light sources and optical sensor in these embodiments are simpler than the traditional triangulation method and thus can be easy to implement.

Figure 1:
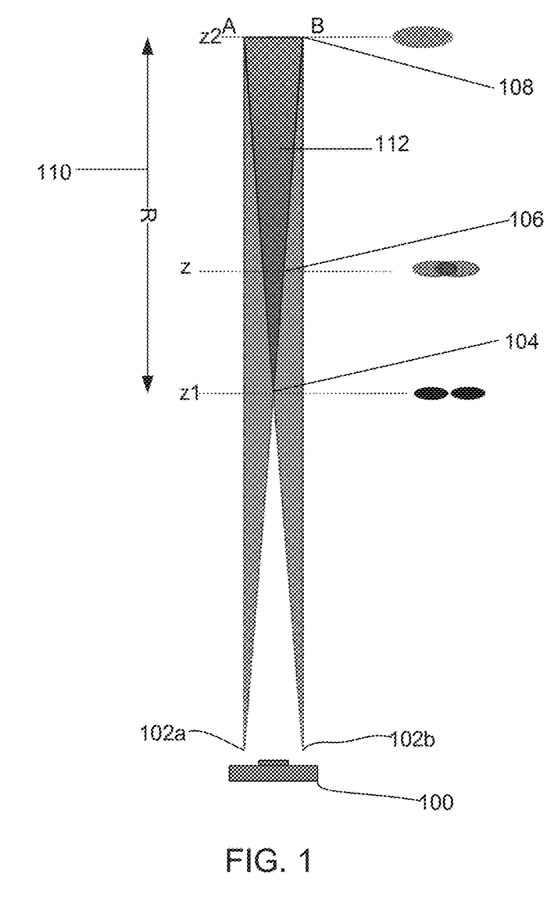
FIG. 1 illustrates an example configuration of light sources and an optical sensor in accordance with the disclosure.

One insight provided by the inventor(s) lies in that a difference between images of the object illuminated by different lights can be determined based on spatial relationships between various points on paths traveled by the lights. This is illustrated in FIG. 1, where an example configuration of light sources and an optical sensor in accordance with the disclosure is shown. As can be seen from FIG. 1, light sources, such as 102a and 102b shown in this figure, can be configured to cast lights. In this example, light source 102a is configured to cast light A and light source 102b is configured to cast light B. As shown, the positions of light sources 102a and 102b may be configured such that light A and light B diverge at point 104, which has a distance Z1 with respect to light source 102a or 102b, and converge at point 108, which has a distance Z2 with respect to light source 102a or 102b. That is, in this example configuration, at point 104, the two lights A and B, do not overlap with each at all, and at point 108, A and B overlap with each completely. Beyond point 108, lights A and B start to separate from each other again. Therefore, such a configuration of light sources 102a and 102b can have the following properties: a given point, such as point 106 shown, between points 104 and 106 is illuminated by both lights A and B; and lights A and B partially overlap with each other at the given point. As can be seen from FIG. 1, the overlapping of A and B at point 106 is a partial overlap.

Assume the distance (also referred to as a "period distance" herein) between points 104 and 108 is R, the overlap level of lights of A and B at a given point, such as point 106 between these two points is proportional with respect to distance R. Such a spatial relationship can then be used to determine the distance of an object placed at the given point 106. For achieving this, an optical sensor, such as optical sensor 100 shown in FIG. 1, can be configured to capture images of the object illuminated by light A and light B. An image difference between the two images can be determined by comparing the two images. The image difference can then be used to determine the overlap level of lights A and B at the given point 106; and the determined overlap level can be used to determine the position of the given point 106 based on the aforementioned spatial relationship among point 104, the given point 106 and point 108.

In implementations, the optical sensor 100 can be configured to capture one image (or frame) when only light source 102a is turned on, and capture another image when only light source 102b is turned on. In some examples, the optical sensor 100 can be configured to capture images at the same time when both light sources 102a and 102b are turned on at the same time. In some examples, the optical sensor 100 can be configured to capture only one image of the object when both light sources 102a and 102b are turned on at the same time. In any case, the images (or RGB channel information in the case of only one image is catpured) captured by optical sensor 100 can be "subtracted" (e.g., through a simple circuitry or logic) to obtain a difference between the two images.

It should be understood, although only two light sources 102a and 102b are illustrated in FIG. 1, this is not intended to be limiting. In some other examples, the number of light sources used in a distance measuring method in accordance with the disclosure can be more than two light sources. For example, it is contemplated that four light sources (2 pairs) may be configured for capturing differences of images of an object placed at a given light spot between points 104 and 108. Generally speaking, adding more light pairs in a configuration can facilitate more period distances R110.

Figure 2:
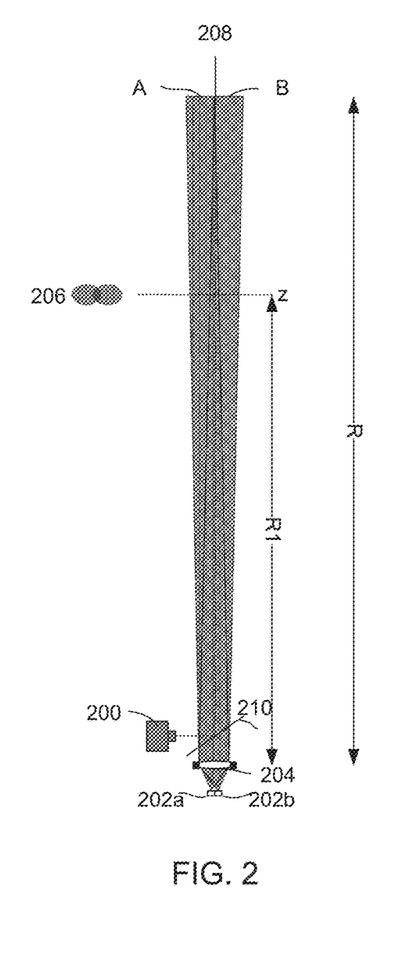
FIG. 2 illustrates another example configuration of light sources and an optical sensor that can be used to determine a distance of an object in accordance with the disclosure.

FIG. 2 illustrates another example configuration of light sources and an optical sensor that can be used to determine a distance of an object in accordance with the disclosure. In this example configuration, the spatial relationship of lights A and B is reversed compared to that in the configuration shown in FIG. 1. In this example, a collimator lens is placed at point 204 such that lights A and B cast by light sources 202a and 202b are collimated at point 204 to cause lights A and B to completely overlap at point 204 and completely separate at point 208. For achieving a given distance R between points 204 and 208, the separation distance between light sources 202a and 202b, a focal length of the collimator lens, a size of an aperture of the collimator lens and/or any other relevant aspect can be configured. Between points 204 and 208, the overlap level of lights A and B at a given point, such as point 206, is inverse proportional with respect to point 204. That is, as the overlap level of the two lights decreases, the distance of the given point 206 away from point 204 increases.

Using this spatial relationship, distance R1 of the given point 206 can be determined based on the overlap level of lights A and B at given point 206 and distance R. In this example configuration, the optical sensor 200 is aligned with lights A and B for capturing image of an object (not shown) illuminated by lights A and B. As shown, a beam splitter 210 may be configured on a path traveled by lights A and B beyond point 204. Unlike the traditional triangulation method mentioned above, the position and/or placement of optical sensor 200 need not be particular. It will be understood, the beam splitter 210 shown in this example is not intended to be limiting. In implementations, the optical sensor 200 may just be placed close to the light sigh sources 202a and 202b without light beam splitter 210.

Figure 3:
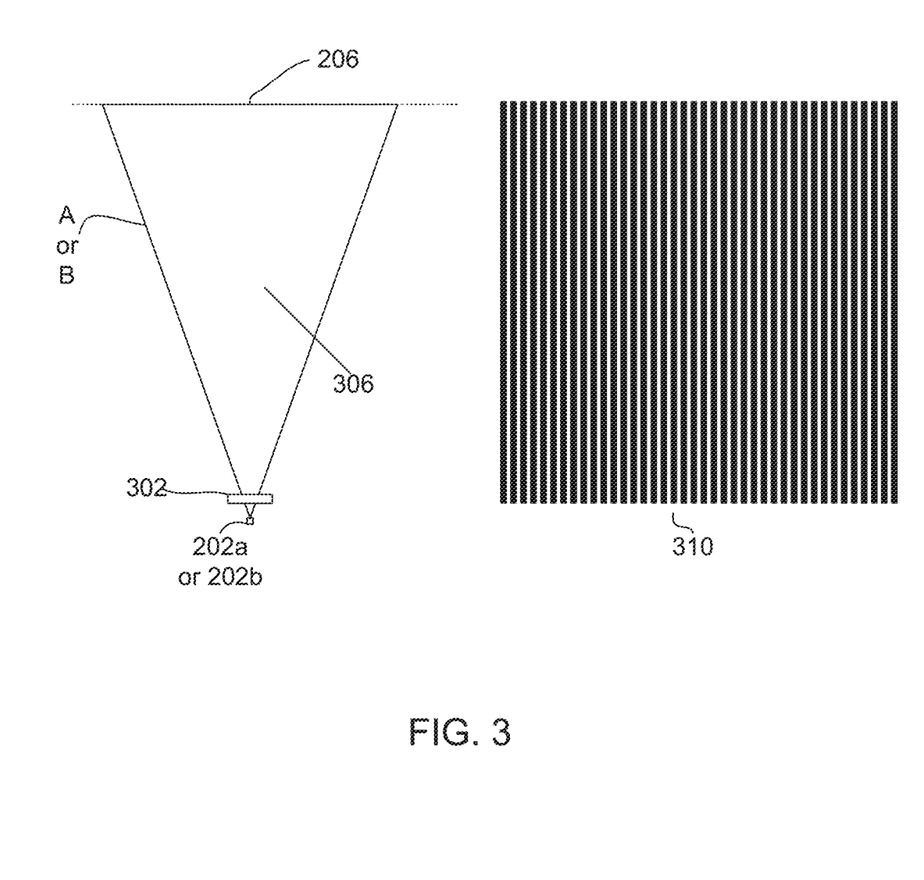
FIG. 3 conceptually illustrates an example structure of light A or B shown in FIG. 2.

FIG. 3 conceptually illustrates an example structure of light A or B shown in FIG. 2. It will be described with reference to FIG. 2. As shown in this example, a light beam structure mask 302, can be placed close to light source 202a or 202b to structure light A or B, which can comprise divergent light beams 306. In this example, the light beam structure mask 302 has patterns capable of structuring light A or B into multiple lines. For illustration of the structure of light A or B in this example, a cross-section 310 of light A or B at point 206 is shown in FIG. 3. As can be seen from cross-section 310, the structured light A or B can include multiple sub-light-spots. Each sub-light-spot may be shaped as line, square, circle, rectangle, or any other shape. In some implementations, the individual sub-light-spots in structured light A or B can even be shaped with an appropriate gradient intensity profile so that the whole light beam cross-section 310 features a pre-defined gradient intensity distribution. In some implementations, the structure of light A or B can include a single line shape or multiple line shapes in accordance with 3D sensing methods generally known in the art. One skilled in the art would understand how to configure light beam structure mask 302 to achieve various line shapes for structuring light A or B as mentioned above.

Figure 4:
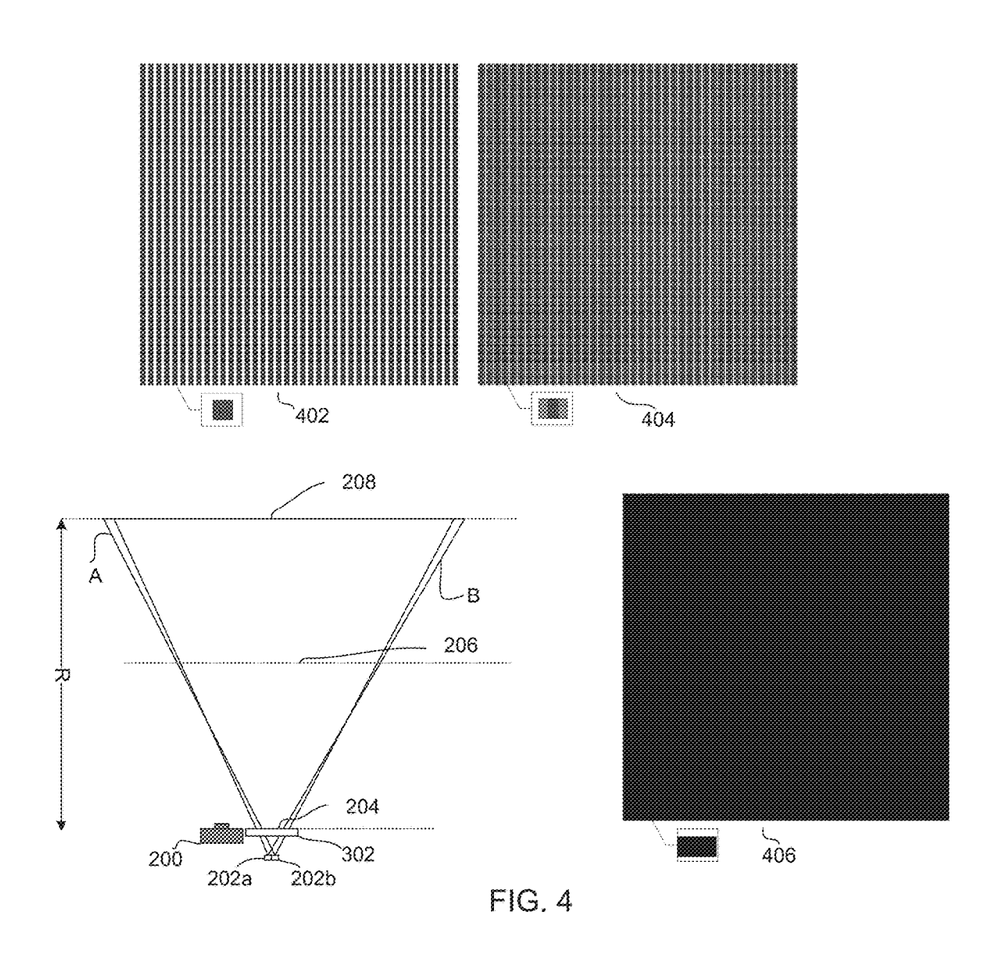
FIG. 4 conceptually illustrates illumination by the two lights shown in FIG. 2.

FIG. 4 conceptually illustrates illumination by the two lights shown in FIG. 2. It will be described with reference to FIG. 2 and FIG. 3. As mentioned above, light source 202a emits light A and light source 202b emits light B to illuminate a scene. The light structure beam mask 302 is used to establish identical light beam structures, such as the ones shown in FIG. 3. As shown, at point 204 (in this example, the light structure beam structure mask 302 is also placed at point 204; however, as mentioned above, this is not necessarily the only case; in some examples, the light beam structure mask 302 may be placed elsewhere so long it is close to light sources 202a and 202b), the sub-light-spots in lights A and B completely overlap with each other. This is illustrated by cross-section 402 of the two lights shown in FIG. 4.

At point 208, the sub-light-spots of two lights A and B start to diverge (separate) completely. This is illustrated by cross-section 406 of the two lights. At point 206, the sub-light-spots of two lights A and B partially overlap. This is illustrated by cross-section 404 of the two lights. Accordingly, using this overlap relationship between lights A and B, as described above, the distance of point 206 with respect to 204 can be determined by comparing positions of sub-light-spots from light A and light B in cross-sections 404. Since the two lights A and B have identical structure through the same light beam structure mask 302, distance R can be used as the distance from the location where sub-light-spots from the lights fully overlap in cross-section 402—i.e., point 204, to the location where sub-light-spots from the lights start to separate completely in cross-section 406—i.e., point 208. In implementations, for achieving a variety of different distances R, more lights may be configured in a similar fashion to light A and light B in various implementations. For example, multiple pairs of lights can be used in some implementations such that each pair of lights have a different period distance R. For achieving a difference length of R, various aspects, such as the separation distance between light sources 202a and 202b can be adjusted. In various implementations, by adjusting the structures of lights A and B, the distance R can be adjusted so that the effective range for the object distance that can be measured can be realized. For example, the number of lines, width of each line and/or any other aspects on the light beam structure mask 302 can be adjusted to achieve different period distance R. By way of illustration, 20 line structured lights A and B will have a different period distance R from 40 line structured lights A and B.

Figure 5A:
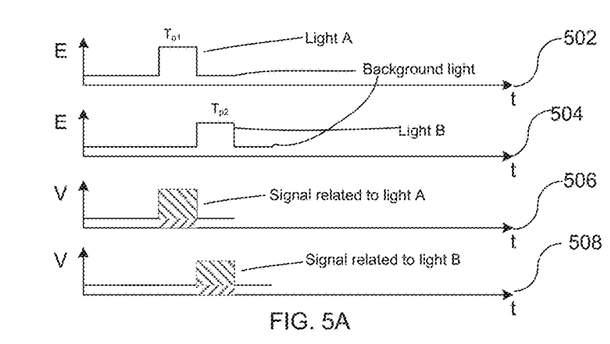
FIG. 5A shows that when a light illuminates a target object placed at a given point, an optical sensor can be used to detect returned light and generate signals accordingly.
Figures 5B, 5C:
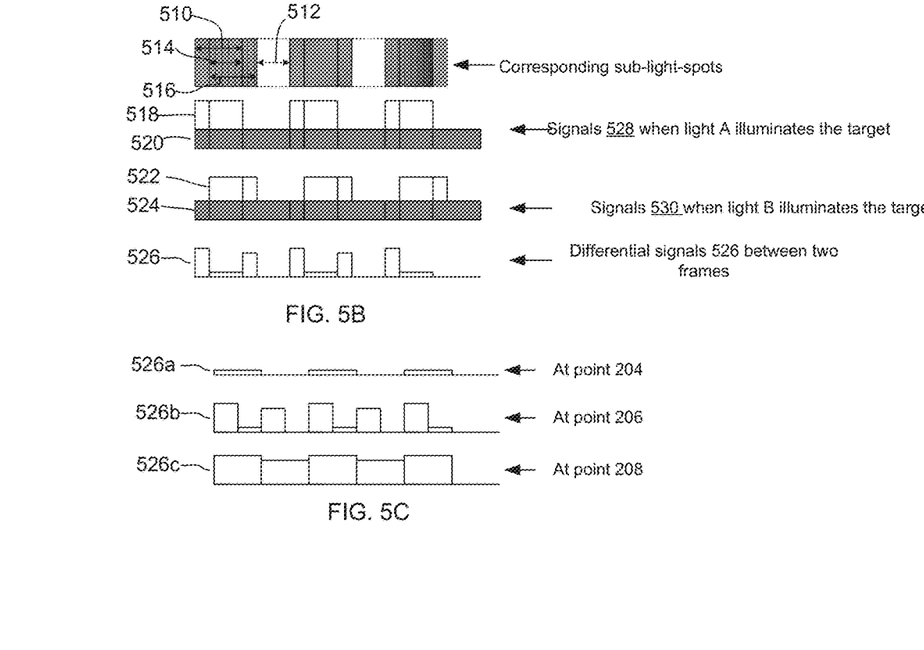
FIG. 5B illustrates an overlap level between two sub-light-spots in the structure of the returned light A and B.
FIG. 5C illustrates three example differential signals corresponding positions shown FIG. 5A.

FIGS. 5A-C conceptually illustrates measurable differences of images of an object illuminated by lights shown in FIG. 2. They will be described with reference to FIG. 2. FIG. 5A shows that when a light illuminates a target object placed at point 206, the optical sensor 200 can detect returned light and generate signals accordingly. Graph 502 indicates returned light from light A (off of the target object) can be captured in a first time period by the optical sensor 200, and graph 504 shows returned light B (off of the target object) can be captured in a second time period by the optical sensor 200. One skilled in the art would understand structures of returned lights A and B are the same (or substantially similar to) lights A and B, respectively. As shown in both graphs 502 and 504, there is a background light also captured by the optical sensor 200 when capturing the returned lights A and B. Graph 506 shows a signal can be generated when the returned light A is captured in the first time period, and graph 508 shows another signal can be generated when the returned light B is captured in the second time period. As shown, both signals can also include signals from the background light.

FIG. 5B illustrates an overlap level between two sub-light-spots in the structure of the returned light A and B. In this example, sub-light-spot 510 is in returned light A and sub-light-spot 516 is in returned light B such that the positions of sub-light-spots 510 and 516 correspond to each other. As shown, sub-light-spots 510 and 516 overlap with each other to form an overlap zone 514. As described above, the size of the overlap zone 514 as well as the spare zone 512 are dependent on the distance of point 206 where the target object is placed. When light A illuminates the target object, a first image (frame) of the target object can be captured by the optical sensor 200 as illustrated by graphs 502 and 506. As explained above, the signals 528 in the first image can include signals 518 generated from the returned light A as well as signals 520 generated from the background light. When light B illuminates the target object, a second image (frame) of the target object can be captured by the optical sensor 200 as illustrated by graphs 504 and 508. As also explained above, the signals 530 in the second image can include signals 522 generated from the returned light B as well as signals 524 generated from the background light. Differential signal 526 can be obtained by comparing signals 528 and 530. As can be seen, the differential signal 526 can be used to determine an overlap level between lights A and B illuminating the target object for measuring the distance of the target object. As mentioned above, in some other examples, both the first and second images of the object described above can be captured at the same time (or substantially the same time) when both light sources are turned on.

FIG. 5C illustrates three example differential signals. As shown, differential signal 526a can be obtained when the target object is placed at point 204; lights A and B, having an identical light structure, fully overlap; and the differential signals 526a are fully dark. Differential signal 526b can be obtained when the target object is placed at point 206; lights A and B partially overlap; and the differential signals 526b has bright and dark areas. Differential signal 526c can be obtained when the target object is placed at point 208; lights A and B totally separate; and the differential signals 526c are totally bright. These differential signals can then be compared (e.g., through a simple logic or circuitry) for determining the overlap level of lights A and B at point 206. It should be understood, lights A and B can be cast at the same time in some implementations, for example, in dark environment, so that the sub-light-spots positions can be detected in one image frame. In some examples, the images of the sub-light-spots can be normalized to record the position information, namely a position image.

Figure 6A:
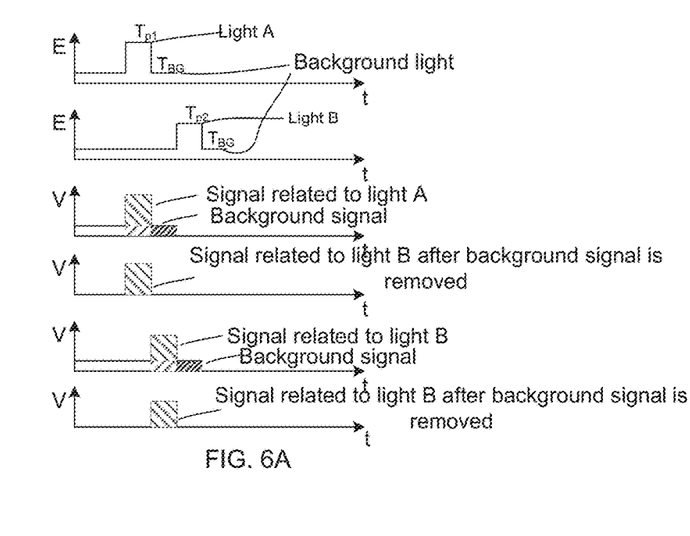
FIG. 6A shows that when a light illuminates a target object placed at a given point, lights captured by an optical sensor can include those from background.
Figure 6B:
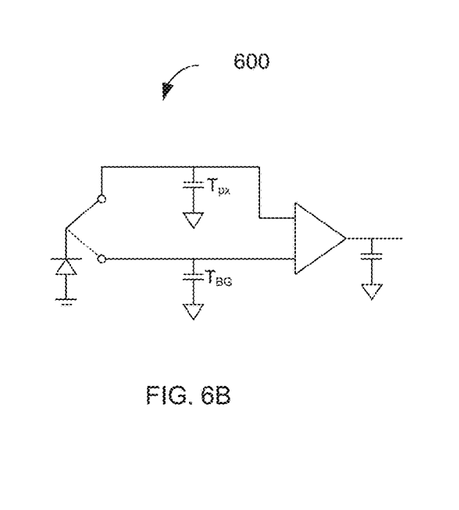
FIG. 6B shows an example circuit that can be implemented to remove background lights captured by optical sensor.
Figure 6C:
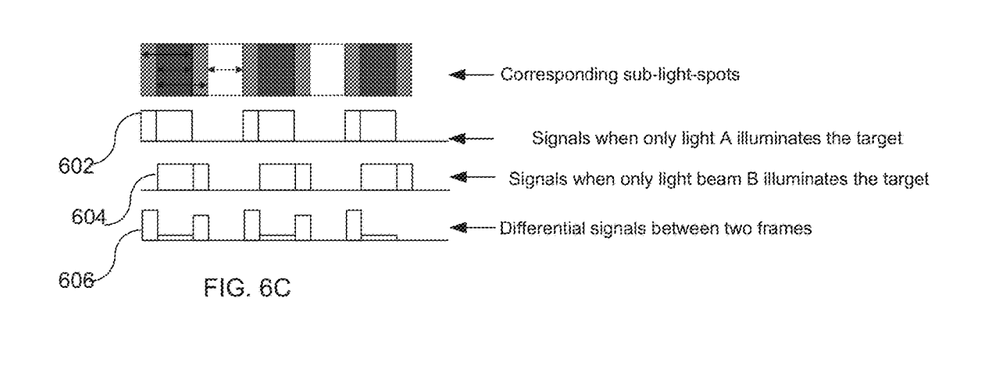
FIG. 6C, shows the differential signals generated for lights A and B do not have the background sections.

In various implementations, a simple logic or circuitry may be designed to remove the background light to simplify the differential signals generation. FIGS. 6A-C illustrate this. They will be described with reference to FIG. 5. Similar to FIG. 5A, FIG. 6A illustrates signals related to light A and light B can be captured in the first time period and the second time period. As shown, initially, the captured signals can include background signals, which may be removed through a simple logic 600 (circuitry) shown in FIG. 6B. As shown in FIG. 6C, the differential signals generated for lights A and B do not have the background sections (such as 520 and 524 shown in FIG. 5B). Because the background lights are removed, the differential signals 602, 604 are for probing lights cast toward the object placed at point 204 and 208 respectively. The differential signals 608 between the two images can carry distance information for the target object placed between points 204 and 208. Light sources 202a and 202b can be turned on at the same time (or substantially the same time) to illuminate the target object so that the sub-light-spots positions in lights A and B can be detected in one image frame.

Figure 7:
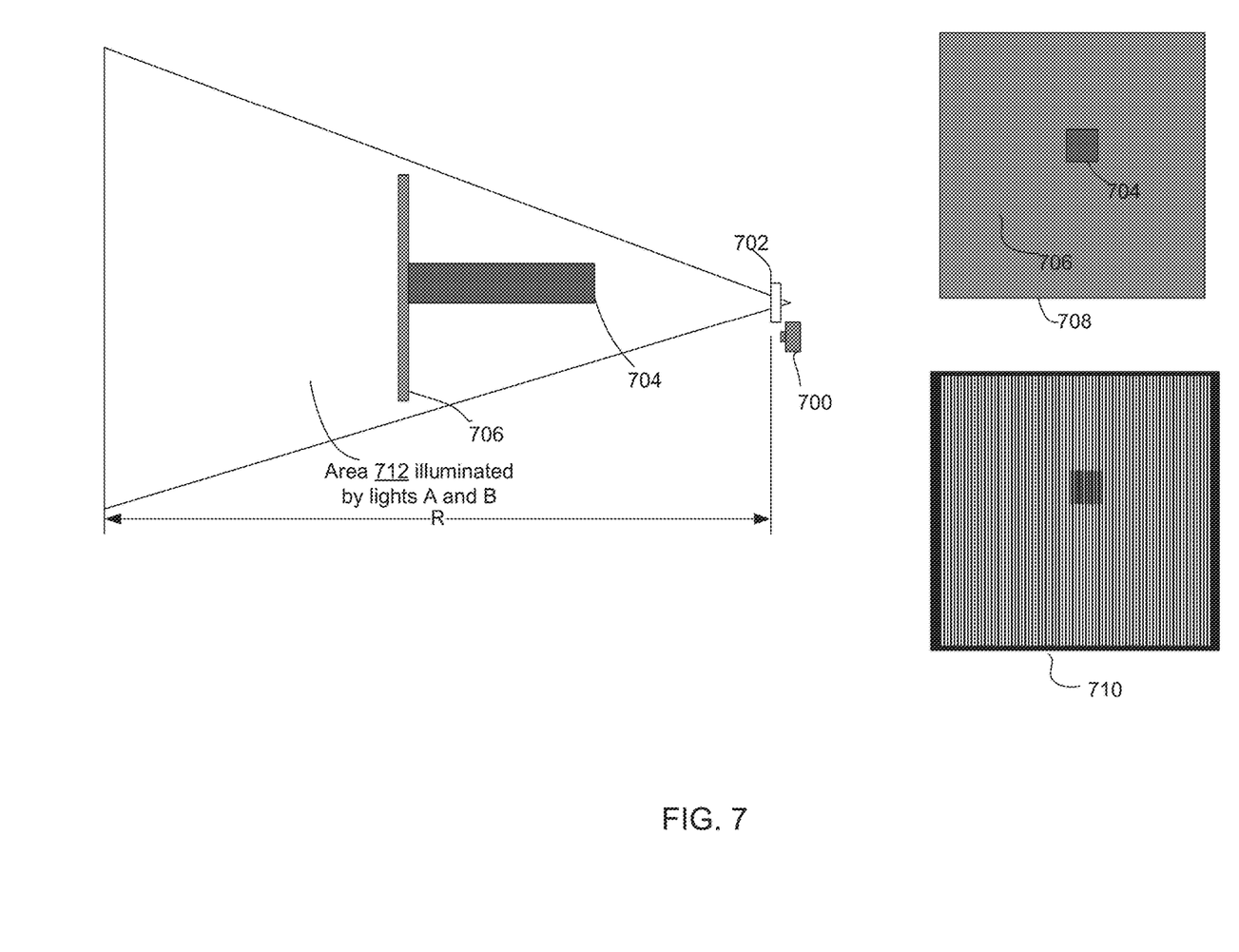
FIG. 7 illustrates a depth image can be obtained using the light source and optical sensor configurations.

FIG. 7 illustrates a depth image can be obtained using the light source and optical sensor configurations described above. As shown in FIG. 7, a flat plate 706 is placed in an area 712 illuminated lights A and B described above. As mentioned above, lights A and B can have an identical structure through a light beam structure mask 702 placed closed to the light sources casting lights A and B. In the configuration shown in FIG. 7, lights A and B also have the overlapping properties as described above. Also shown in FIG. 7 is that an object, such as a square prism 704 can be placed in front of plate 706. The optical sensor 700 can be configured to capture an image 708 when light A is cast by a light source, such as light source 202a. As shown, image 708 contains representations of the plate 706 and square prism 704. Although only one image 708 is illustrated in FIG. 7, one skill in the art will understand one image can be captured when light A illuminates the plate 706 and square prism 704, and another image can be captured when light B illuminates the plate 706 and square prism 704.

In implementations, after image illuminated by light A and image illuminated by light B are captured by optical sensor 700, each image's pixel brightness may be normalized so that only the sub-light-spots' positions are kept. The sub-light-spot positions difference between the two images can be used to determine a depth image 710 of the target object using the overlapping spatial relationship of A and B as described above. In some implementations, as in this example, the depth image 710 can describe the target distance with gray level. A darker position in image 710 means the target is closer with respect to point 204. However, this is not intended to be limiting. In some examples, the depth image 710 may be determined with reverse expression as compared to the one shown in FIG. 7. That is, in those examples, darker positions in the depth image 710 mean the target objet is further away from point 204. In some examples, the depth image 710 may also be denoted with false color composite image.

Figure 8:
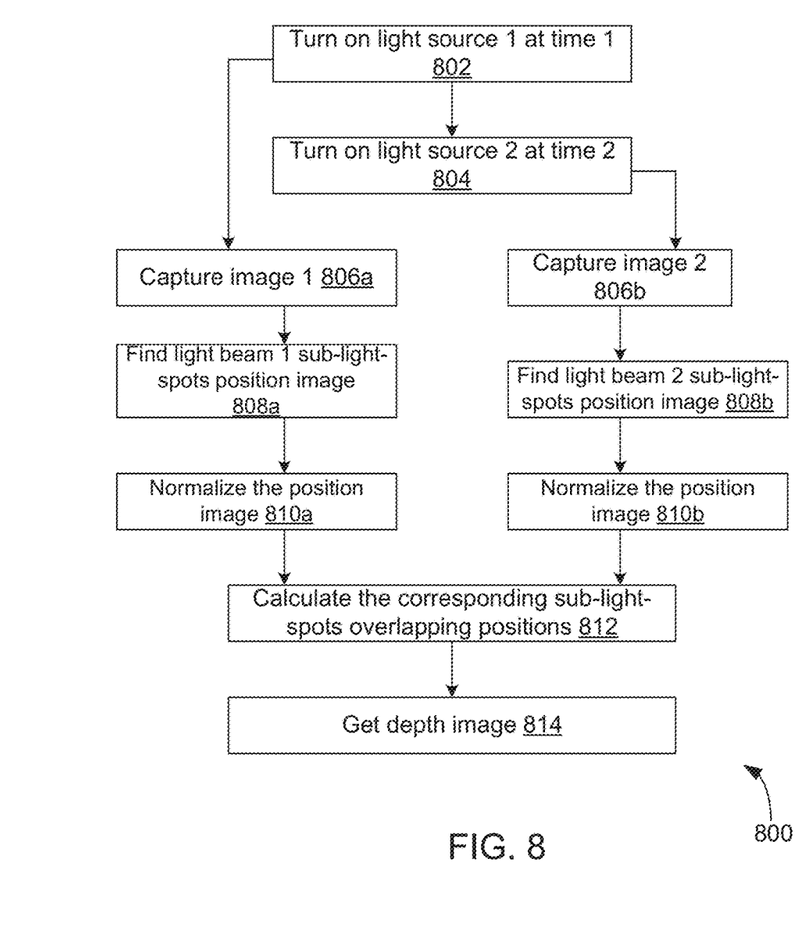
FIG. 8 illustrates one exemplary method for measuring a distance of an object in accordance with the disclosure.

FIG. 8 illustrates one exemplary method 800 for measuring a distance of an object in accordance with the disclosure. The method presented in FIG. 8 and described below is intended to be illustrative and non-limiting. The particular series of processing steps depicted in FIG. 8 is not intended to be limiting. It is appreciated that the processing steps may be performed in an order different from that depicted in FIG. 8 and that not all the steps depicted in FIG. 8 need be performed.

In some embodiments, the method depicted in method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At 802, light source 1 can be turned on to illuminate an object. An example configuration of such a light source, e.g., light source 102a or 202a is shown in FIGS. 1-2. As described and illustrated herein, the light source 1 can cast a light towards the object to illuminate the object. In some examples, a light beam structure mask, such as 302 shown in FIG. 3, can be used to form a structure of the light cast by light source 1. As described above and illustrated herein, the structure of the light can have sub-light-spots.

At 804, light source 2 can be turned on to illuminate the object. An example configuration of such a light source, e.g., light source 102 b or 202b is shown in FIGS. 1-2. The light cast by light source 2 can have the same structure as the light cast by light source 1 at 802. This can be achieved through the light beam structure mask described above. As mentioned above, in some implementations, light source 1 and light source 2 can be turned on at the same time or at substantially the same time. In those examples, after both light sources are turned on, one image of the target object can be captured as the target object is being illuminated by the lights cast by both sources at the same time. However, this is not necessarily the only case. In some implementations, light source 1 and light source 2 can be turned on at different times. In those examples, an image of the target object can be captured when light source 1 is turned on, and another image of the target object can be captured when light source 2 is turned on.

At 806a, a first image of an object can be captured. At 806b, a second image of an object can be captured. As mentioned above, the timing of 806a and 806b is not limited.

At 808a, sub-light-spot positions in the light cast by light source 1 can be found in the image captured at 806a. At 808b, sub-light-spot positions in the light cast by light source 2 can be found in the image captured at 806b. This is illustrated in FIG. 3.

At 810a, the image of sub-light-spots found at 808a can be normalized to record the positions to obtain a position image. At 810a, the image of sub-light-spots found at 808b can be normalized to record the positions to obtain another position image.

At 812, for one or more of corresponding sub-light-spots in the position images obtained at 810a and 810b, an overlap level of the sub-light-spots can be determined. This is illustrated in FIG. 5B and FIG. 6B.

At 814, a depth image of the target object can be obtained based on the overlap level determined at 812 and the distance R shown in FIG. 2. The proportional (or inverse proportional) relationship between the overlap level determined at 812 and the distance R is described above and illustrated in FIGS. 5C and 6C.

Referring back to FIG. 2, in some implementations, the optical sensor 200 may be configured to capture color images with RGB information. In those examples, lights A and B can be configured to have different colors. For example, light A can be a blue light, and light B can be a red light. In those examples, since light A and light B have different RGB colors, light sources 1 and 2 can be turned on at the same time (or substantially the same time) and only one image of the target object need be captured. The image can then be analyzed to obtain sub-light-spot positions for the blue light (i.e. light A) and sub-light-spot positions for the red light (i.e., light B); and the overlap level of lights A and B can then be determined based the analysis as described above.

Figure 9:
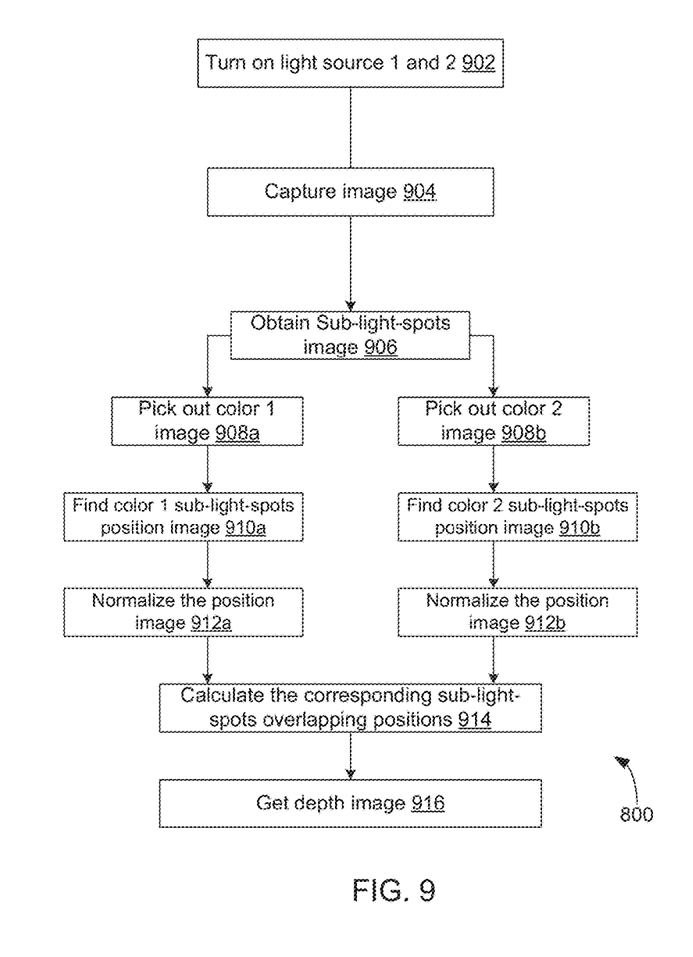
FIG. 9 illustrates one exemplary method for measuring a distance of an object in accordance with the disclosure.

FIG. 9 illustrates an example method for measuring a distance of the target object using an optical sensor configured to capture color images and light sources casting different colored light. The method presented in FIG. 9 and described below is intended to be illustrative and non-limiting. The particular series of processing steps depicted in FIG. 9 is not intended to be limiting. It is appreciated that the processing steps may be performed in an order different from that depicted in FIG. 9 and that not all the steps depicted in FIG. 9 need be performed.

In some embodiments, the method depicted in method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At 902, light source 1 and light source 2 can be turned on to illuminate an object. As mentioned above the lights cast by light sources 1 and 2 can have different RGB colors. An example configuration of light sources is shown in FIGS. 1-2. In some examples, a light beam structure mask, such as 302 shown in FIG. 3, can be used to form structures of the lights cast by light sources 1 and 2. As described above and illustrated herein, such a structure can have sub-light-spots.

At 904, an image of an object can be captured as the object being illuminated by the lights cast at 902. As mentioned above, a color optical sensor such as a color camera can be used to capture an image of the object, which can contain RGB information.

At 906, sub-light-spot images for the lights cast by light sources 1 and 2 can be obtained from the image captured at 904. At 908a, color information for the light cast by light source 1 can be obtained from the sub-light-spot image corresponding to light A. At 908b, the color information for the light cast by light source 2 can be obtained from the sub-light-spot image corresponding to light B.

At 910a, sub-light-spot positions in the light cast by light source 1 can be found in the image captured at 908a. At 910b, sub-light-spot positions in the light cast by light source 2 can be found in the image captured at 908b. This is illustrated in FIG. 3.

At 912b, the image of sub-light-spots found at 910a can be normalized to record the positions to obtain a position image. At 912a, the image of sub-light-spots found at 910b can be normalized to record the positions to obtain another position image.

At 914, for one or more of corresponding sub-light-spots in the position images obtained at 910a and 910b, an overlap level of the sub-light-spots can be determined. This is illustrated in FIG. 5B and FIG. 6B.

At 916, a depth image of the target object can be obtained based on the overlap level determined at 912 and the distance R shown in FIG. 2. The proportional (or inverse proportional) relationship between the overlap level determined at 912 and the distance R is described above and illustrated in FIGS. 5C and 6C.

Figure 10:
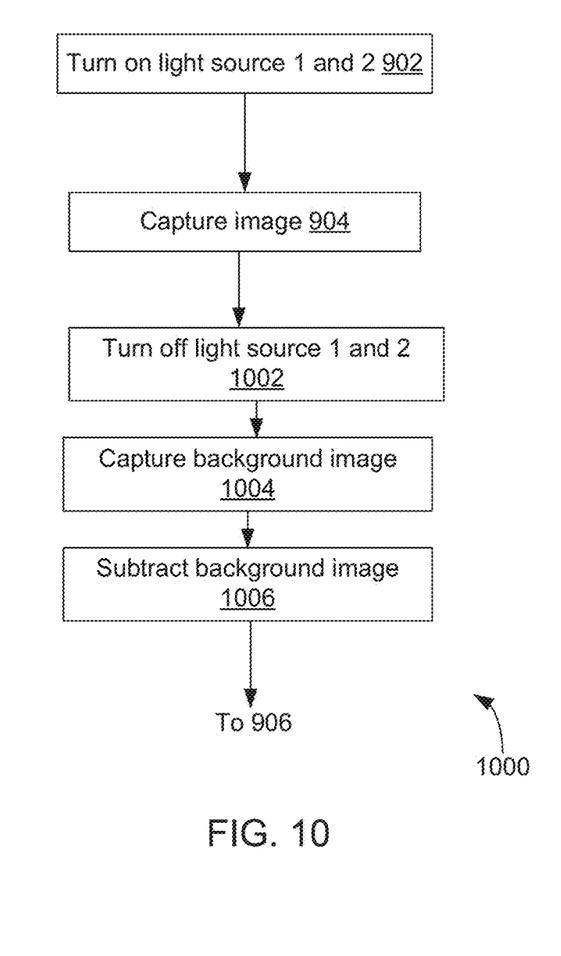
FIG. 10 illustrates still another exemplary method for measuring a distance of an object in accordance with the disclosure.

FIG. 10 illustrates another example method 1000 for measuring a distance of an object in accordance with the disclosure. It will be describe with FIG. 9. In this example method, method 1000 includes operations 1002, 1004 and 1006 between operations 904 and 906. As can be seen, after the image of the object is captured at 904, in some examples, as in this example, both light sources 1 and 2 can be turned off at 1002. At 1004, a background image can be captured. At 1006, the background image captured at 1004 can be subtracted from the image captured at 904. This illustrated in FIG. 6A and FIG. 6C. The removal of background light in the image captured at 904 can simplify subsequent process to differentiate lights A and B, and to determine an overlap level between two corresponding sub-light-spots of different RGB colors in the image captured at 904.

The present disclosure further provides an apparatus for measuring a distance of an object. The apparatus comprises an optical sensor, a first light source, a second light source and/or any other component. The first light source can be configured to emit a first light toward the object; and the second light source is configured to emit a second light toward the object, the first light and second light converges at a first point and diverges at a second point. The configurations of first and second light sources may be references in FIGS. 1-4, and their associated texts. The optical sensor is configured to capture a first image of the object illuminated by the first light; and capture a second image of the object illuminated by the second light. The configurations of the optical sensor can be references in FIGS. 4-7 and their associated texts. The apparatus can be configured to determine an image difference between the first image and the second image of the object; and determine the distance of the object with respect to the first point based on the image difference and a distance difference between the first point and the second point. Such configurations of the apparatus can be reference in FIGS. 8-10.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

Described above are preferred embodiments of the present disclosure, and any equivalent modifications, and the like made within the scope of the present disclosure should be covered within the scope of the present disclosure.

The described embodiments above are merely preferred embodiments of the present disclosure, but are not intended to limit the present disclosure. Any modification, equivalent replacement, and improvement made without departing from the spirit and principle of the present disclosure may fall within the protection scope of the present disclosure.

What is claimed is:

1. A method for measuring a distance of an object, the method comprising:
    emitting, by a first light source, a first light toward the object;
    emitting, by a second light source, a second light toward the object, wherein the first light and second light converges at a first point and diverges at a second point;
    using an optical sensor to capture a first image of the object illuminated by the first light;
    using the optical sensor to capture a second image of the object illuminated by the second light;
    determining an image difference between the first image and the second image of the object;
    determining the distance of the object with respect to the first point based on the image difference and a distance difference between the first point and the second point; and, wherein
    the method further comprises placing a light beam structure mask near the first and second light sources to structure the first light and the second light to obtain structured first light and structured second light, wherein the structured first light and the structured second light have an identical structure, wherein a first sub-light-spot in the structured first light corresponding to a first sub-light-spot in the structured second light, and wherein determining the image difference between the first image and the second image of the object comprises:
    comparing a position of the first sub-light-spot in the structured first light and a position of the first sub-light-spot in the structured second light; and
    determining an overlap level between the first sub-light-spot in the structured first light and the first sub-light-spot in the structured second light based on the comparison.

2. The method of claim 1, wherein the first light and the second light completely overlap the first point.

3. The method of claim 1, wherein the first light and the second light completely diverge at the second point.

4. The method of claim 1, wherein the image difference indicates a level of overlap between the first light and the second light.

5. The method of claim 1, wherein the structured first light and the structured second light comprise a set of sub-light-spots such that each sub-light-spot in the structured first light correspond to a sub-light-spot in the structured second light.

6. The method of claim 1, further comprising:
    normalizing the first image and second image to obtain corresponding position images for determining the overlap level between the first sub-light-spot in the structured first light and the first sub-light-spot in the structured second light.

7. The method of claim 1, wherein the optical sensor is configured to capture a color image, and the first light and the second light have different colors.

8. The method of claim 7, wherein the first image and the second image is a same image, and wherein the first light and second light illuminate the object at the same time or substantially the same time.

9. The method of claim 1, wherein the first light and the second light illuminate the object at the same time or substantially the same time, and wherein the first image and second image is captured at the same time.

10. The method of claim 1, further comprising removing background light in the first and second images for determining the image difference.

11. An apparatus for measuring a distance of an object, the apparatus comprising an optical sensor, a first light source, a second light source, wherein:
    the first light source is configured to emit a first light toward the object;
    the second light source is configured to emit a second light toward the object, wherein the first light and second light converges at a first point and diverges at a second point;
    the optical sensor is configured to:
        capture a first image of the object illuminated by the first light; and
        capture a second image of the object illuminated by the second light; and, wherein
        the apparatus comprises a processing device configured to:
        determine an image difference between the first image and the second image of the object; and
        determine the distance of the object with respect to the first point based on the image difference and a distance difference between the first point and the second point; and, wherein
    the apparatus further comprises a light beam structure mask placed near the first and second light sources to structure the first light and the second light to obtain structured first light and structured second light, wherein the structured first light and the structured second light have an identical structure, wherein the structured first light and the structured second light comprise a set of sub-light-spots such that each sub-light-spot in the structured first light correspond to a sub-light-spot in the structured second light, and wherein a first sub-light-spot in the structured first light correspond to a first sub-light-spot in the structured second light, and wherein determining the image difference between the first image and the second image of the object comprises:
    comparing a position of the first sub-light-spot in the structured first light and a position of the first sub-light-spot in the structured second light; and
    determining an overlap level between the first sub-light-spot in the structured first light and the first sub-light-spot in the structured second light based on the comparison.

12. The apparatus of claim 11, wherein the image difference indicates a level of overlap between the first light and the second light.

13. The apparatus of claim 11, wherein the optical sensor is configured to capture a color image, and the first light and the second light have different colors.

14. The apparatus of claim 13, wherein the first image and the second image is a same image, and wherein the first light source and second light source are configured such that the first light and second light illuminate the object at the same time or at substantially the same time.

15. The apparatus of claim 11, wherein the first light source and second light source are configured such that the first light and the second light illuminate the object at the same time or at substantially the same time, and wherein the optical sensor is configured to capture the first image and second image at the same time.

16. The apparatus of claim 11 is further configured to remove background light in the first and second images for determining the image difference.

* * * * *